No. 795,848. PATENTED AUG. 1, 1905.
R. G. NASH.
MEANS FOR CHARGING BOTTLES OR THE LIKE WITH LIQUIDS AND APPLYING STOPPERS, OR SEALS THERETO.
APPLICATION FILED OCT. 29, 1902.

5 SHEETS—SHEET 1.

Witnesses: Inventor:
Richard Grainger Nash

No. 795,848. PATENTED AUG. 1, 1905.
R. G. NASH.
MEANS FOR CHARGING BOTTLES OR THE LIKE WITH LIQUIDS AND APPLYING STOPPERS OR SEALS THERETO.
APPLICATION FILED OCT. 29, 1902.

5 SHEETS—SHEET 2.

Witnesses: Inventor:
Richard Grainger Nash.

No. 795,848. PATENTED AUG. 1, 1905.
R. G. NASH.
MEANS FOR CHARGING BOTTLES OR THE LIKE WITH LIQUIDS AND APPLYING STOPPERS OR SEALS THERETO.
APPLICATION FILED OCT. 29, 1902.

5 SHEETS—SHEET 3.

WITNESSES:
C. J. Ashdown.
H. Coker.

INVENTOR:
Richard Grainger Nash
per G. J. W. Hardingham
Attorney.

No. 795,848. PATENTED AUG. 1, 1905.
R. G. NASH.
MEANS FOR CHARGING BOTTLES OR THE LIKE WITH LIQUIDS AND APPLYING STOPPERS OR SEALS THERETO.
APPLICATION FILED OCT. 29, 1902.

5 SHEETS—SHEET 5.

Witnesses:
Inventor:

UNITED STATES PATENT OFFICE.

RICHARD GRAINGER NASH, OF LUCAN, NEAR DUBLIN, IRELAND.

MEANS FOR CHARGING BOTTLES OR THE LIKE WITH LIQUIDS AND APPLYING STOPPERS OR SEALS THERETO.

No. 795,848.     Specification of Letters Patent.     Patented Aug. 1, 1905.

Application filed October 29, 1902. Serial No. 129,320.

*To all whom it may concern:*

Be it known that I, RICHARD GRAINGER NASH, a subject of the King of Great Britain and Ireland, residing at Finnstown House, Lucan, near Dublin, Ireland, have invented new and useful Improved Means for Charging Bottles or the Like with Liquids and Applying Stoppers or Seals Thereto, of which the following is a specification.

This invention relates to means for charging bottles or similar receptacles with liquids—such as aerated waters, beers, wines, milk, &c.—and the stoppering or sealing of such bottles or receptacles when so charged, my objects being to dispense with hand labor in accomplishing the various operations involved and to render the apparatus capable of employment with bottles or receptacles furnished with seals of various kinds, including those of the screw type.

Figures 1, 2:
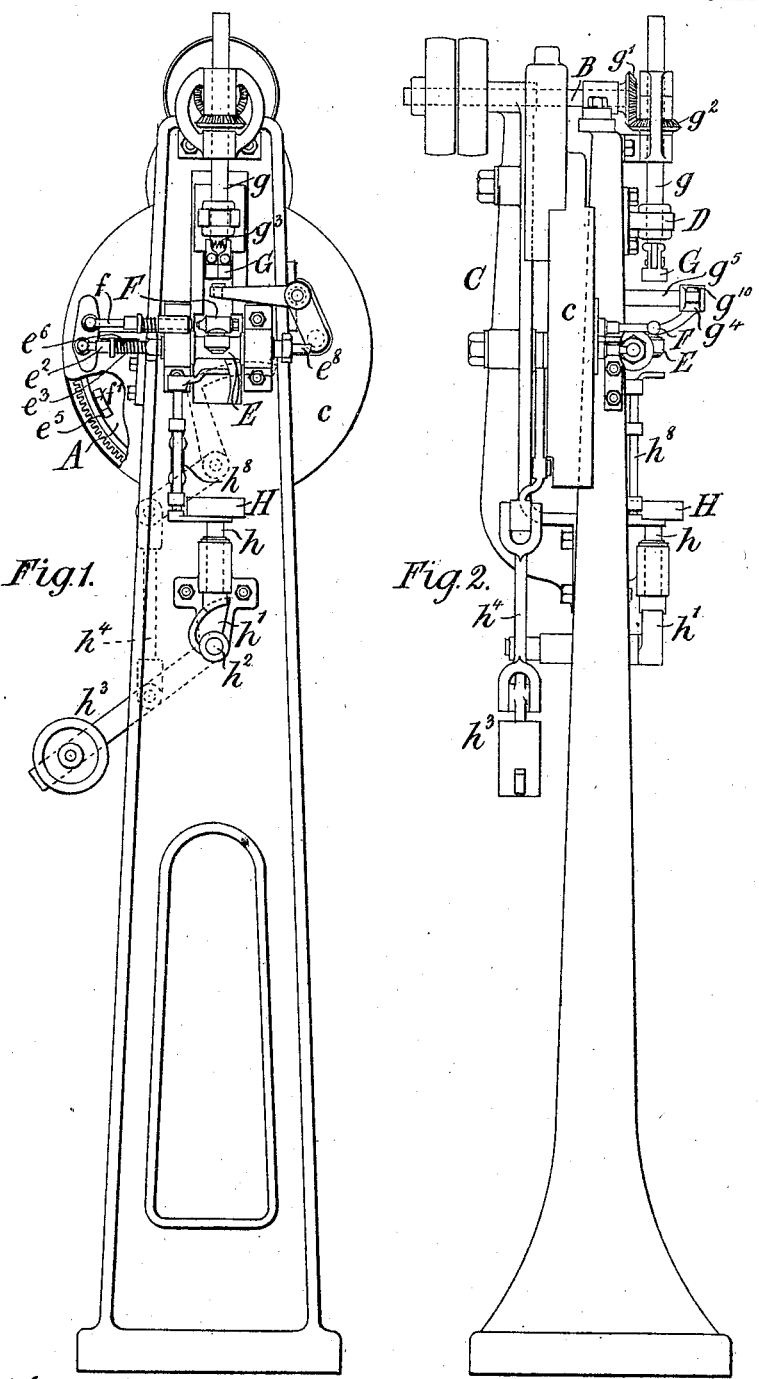
Figures 3, 4:
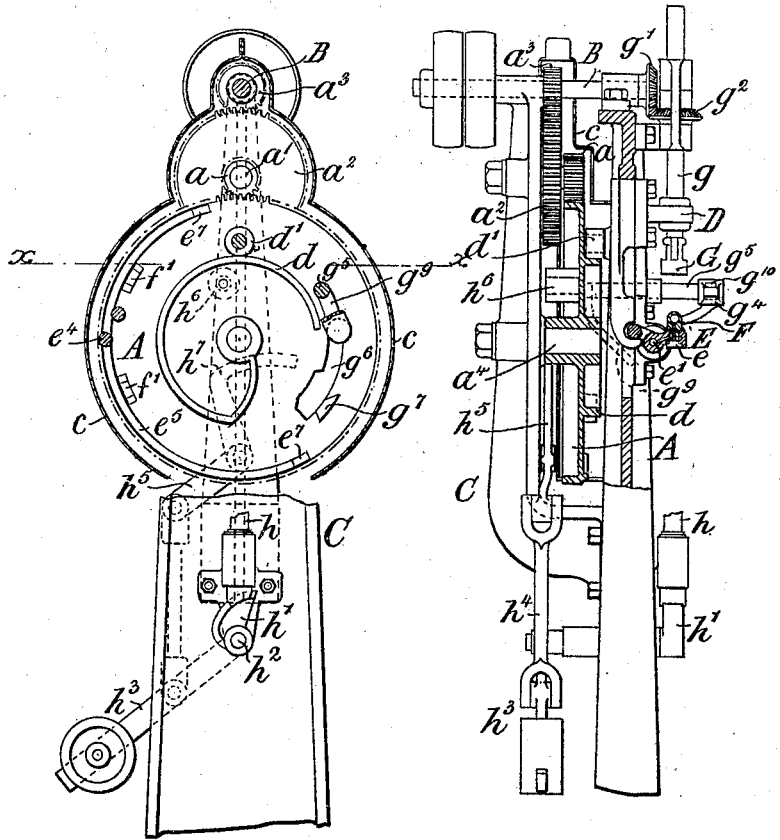
Figure 5:
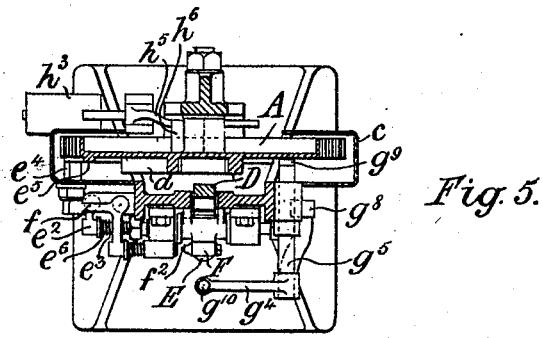
Figure 6:
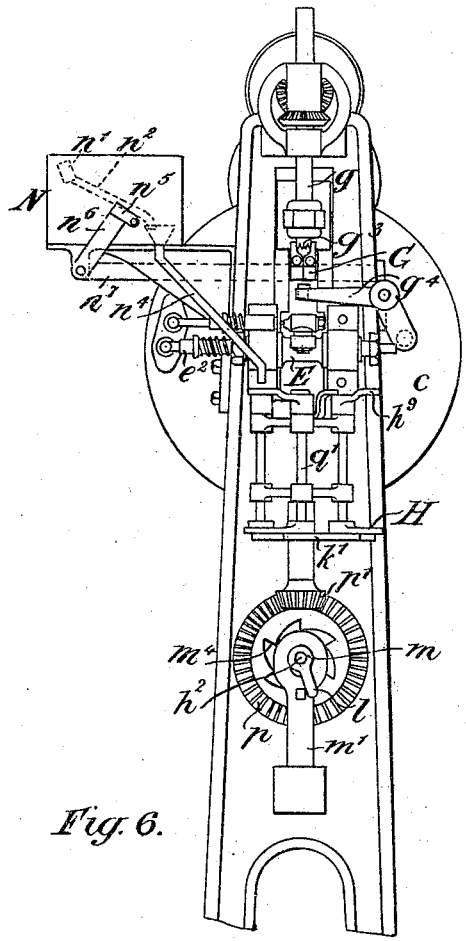
Figure 7:
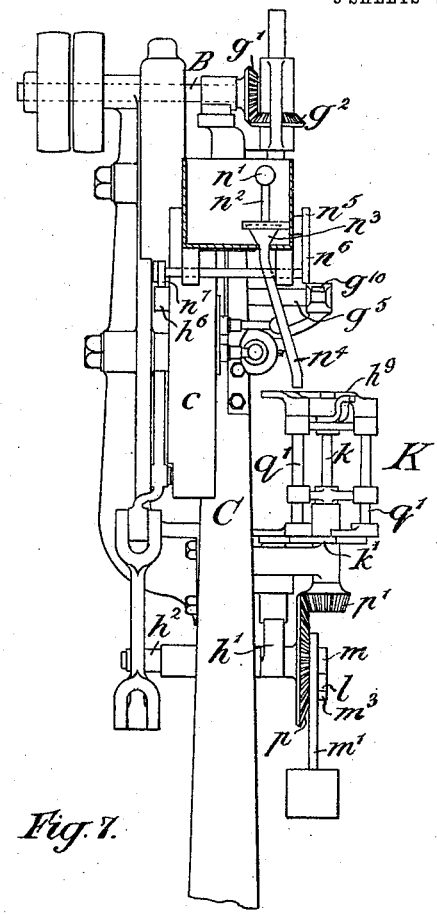
Figure 8:
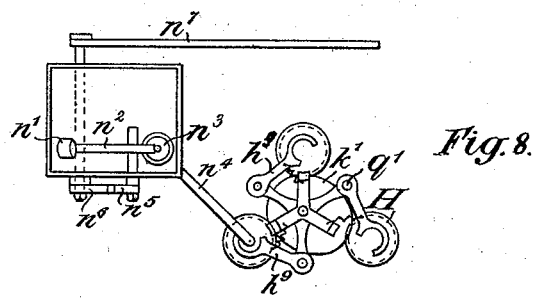
Figure 9:
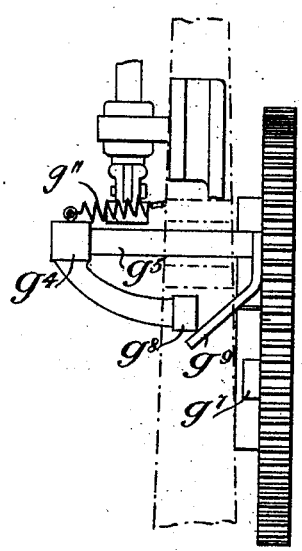
Figure 10:
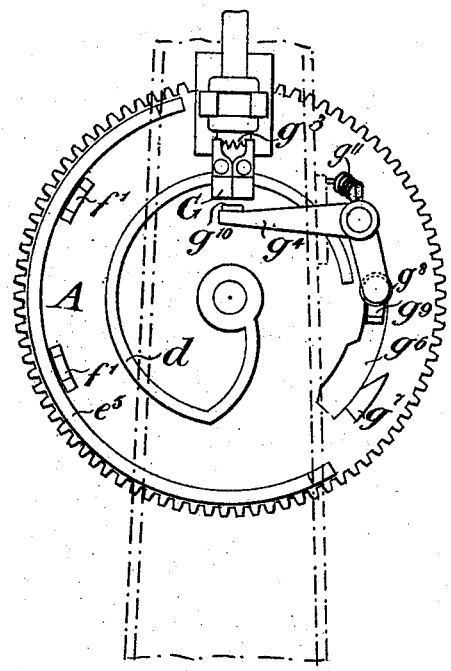
Figure 11:
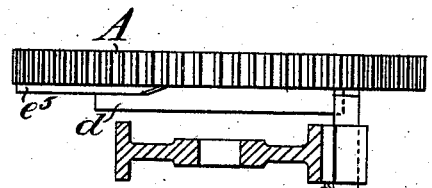
Figure 12:
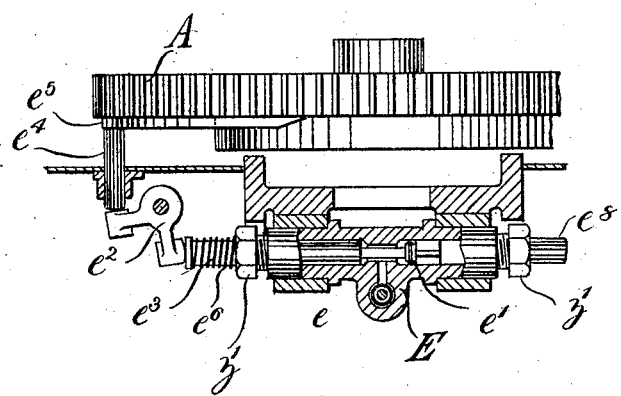
Figure 13:
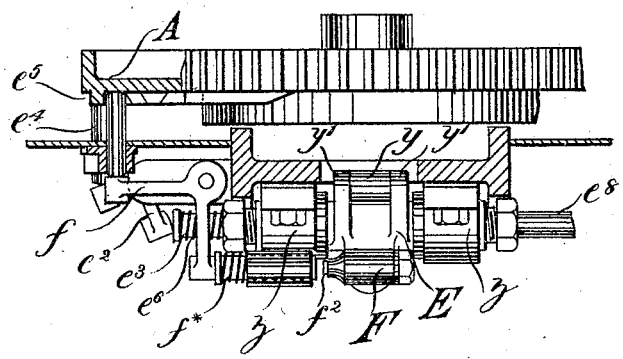

In the accompanying drawings, which illustrate a machine constructed according to my invention, Figure 1 is a face view, and Fig. 2 a side view, of the machine. Fig. 3 is a view with the several parts on the front of the machine removed, showing the arrangement of driving mechanism and actuating-cams. Fig. 4 is an elevation, partly in section, corresponding with Fig. 3; and Fig. 5 is a horizontal section taken on the line $x\ x$ in Fig. 3. Figs. 6, 7, and 8 are illustrations of certain modifications, the views being respectively a face view of the upper part of the machine, side elevation corresponding with Fig. 6, and a plan of the syrup-tank and bottle-holder. Figs. 9, 10, and 11 are detail views, to enlarged scale, of the stopper-feeding device, while Figs. 12 and 13 are detail views of the charging and snifting valves.

Apparatus constructed according to my invention and adapted for accomplishing the objects above referred to comprises a disk A, which is toothed circumferentially and driven by a spur-wheel $a$, keyed on a stud $a'$, this stud having keyed thereon another spur-wheel $a^2$, in mesh with a spur-wheel $a^3$ on the driving-shaft B of the machine. The spur-gearing is inclosed in a suitable casing $c$. The disk A is mounted upon a stud $a^4$, secured to the frame C of the machine, and is furnished upon its face with cam-surfaces or projections disposed in such a manner as to successively operate the various mechanisms pertaining to the several steps in the charging and sealing process.

Mounted in the frame C is a slide D, to which a vertical movement is imparted by means of a cam-surface $d$ on the face of the disk A engaging a roller $d'$ or its equivalent on the slide, this cam-surface being of such a character that the slide is raised somewhat rapidly and then maintained in its raised position during the greater part of the revolution of the disk.

Pivotally mounted in the brackets $z\ z$ on the frame of the machine is the charging-head E, the inlet-pipe $e^3$ and the valve-spindle $e^3$ being made water-tight by means of packing-rings secured by nuts $z'\ z'$ on the ends of the charging-head. After a bottle has been charged the charging-nozzle $e$ is removed from contact therewith, in order to permit of the sealing device coming into operation, by means of the slide D turning on its pivot, the charging-head E. The connection between the slide and the charging-head is effected by a recess in the former, which engages a pin $y$, carried between the arms $y'\ y'$, projecting from the rear of the charging-head. The head is provided with a valve $e'$ for admitting the liquid to the charging-nozzle $e$, which liquid enters by way of the pipe $e^8$. This valve $e'$ is operated by means of a bell-crank lever $e^2$, whereof one arm is connected with the valve-spindle $e^3$ and the other arm is operated by means of a distance-piece $e^4$, which works over another cam-surface $e^5$ on the disk A, a spring $e^6$ on the valve-spindle tending to maintain the valve closed. The cam-surface $e^5$ is of such a length as to insure that the valve shall be maintained open for a sufficient time to effect the proper charging of the receptacle, the liquid flowing slowly at first, owing to the incline $e^7$ on the cam-surface, whereby the syrup previously placed in the receptacle is covered before the full flow of water takes place, foaming being thereby prevented.

The charging-head E is provided with a snifting-valve F for the purpose of releasing the pressure in the bottle in the usual manner. The snifting-valve is operated by a bell-crank lever $f$ and suitably-disposed cam-pieces $f'$ or projections on the disk A, the bell-crank lever $f$ being adapted, by means of the spring-pressed spindle $f^*$, against which it presses, to operate the valve F, the latter being normally closed by a spring on its spindle $f^2$.

The device whereby the sealing or stoppering is effected is carried by the slide D and comprises a pair of jaws G or equivalent means for gripping and holding the screw-cap, stopper, or other sealing device, the jaws being carried in lugs formed on or carried by a vertically-sliding spindle $g$, to which rotary motion is imparted by means of bevel-gearing $g'$ $g^2$, driven from the shaft B. The jaws G may be maintained closed by a suitably-arranged spring $g^3$. The cap or other seal $g^{10}$ is placed on a carrier $g^4$, pivotally mounted on a rod $g^5$, in order to admit of the seal being moved up to the jaws G. The rod $g^5$ is capable of an endwise movement in a suitable bearing on the frame of the machine and is provided with an inclined wing or tailpiece $g^9$. A flat portion of the tailpiece $g^9$ bears upon the face of the disk A until just before the stoppering device comes into operation a slot $g^6$, formed concentrically in the said disk, arrives opposite the tailpiece, whereupon the latter is drawn, by means of a spring $g^{11}$, into the slot, the carrier $g^4$ being thereby brought into a position in the same vertical plane as the stoppering device. In order to press the seal between the jaws G, a projection $g^7$ alongside the slot comes into contact with a roller $g^8$ on an arm of the carrier, the latter being thereby turned on the rod $g^5$. The carrier is moved out of the plane of the jaws for the reception of another seal by the inclined portion of the tailpiece $g^9$ being pressed outwardly by the end of the slot $g^6$. The bottle or other receptacle is supported upon a vertically-movable block H, whereof the stem $h$ is arranged to bear against the periphery of a cam $h'$, the latter being mounted upon a shaft $h^2$, to which an intermittent rocking motion is imparted by means of a weighted arm or lever $h^3$, connected by a link $h^4$, with a bell-crank lever $h^5$, which is operated, preferably by a roller $h^6$, carried on the disk A. The bell-crank lever $h^5$ has one arm $h^7$ formed with a curve, the object being to first lower the block H by means of the roller $h^6$, throwing over the arm $h^7$ for the insertion of the bottle, and then to impart a gentle upward movement to the block and bottle by means of the curve on the arm $h^7$ in order to avoid the risk of breakage of the bottle upon its coming into contact with the charging-nozzle E. A guide $h^8$ may be provided for maintaining the bottle in position while being charged and sealed.

Instead of a single support for the bottle I may provide the machine with a rotatable device K, adapted for the reception of two, three, or more bottles, the device being mounted upon a stem or spindle $k$, to which an intermittent rotary motion is imparted from the rocking shaft $h^2$ by suitable means, such as bevel-gearing $p$ $p'$. The shaft is furnished with an arm $m'$, adapted to engage the pendent arm $l$ of a collar $m$, carried by the said shaft, such pendent arm in turn engaging, by means of a pin $m^3$ passing through the arm $m'$, one of a series of studs or projections $m^4$ on the bevel-wheel $p$, mounted on the said shaft $h^2$. The cam $h'$ on the rocking shaft is arranged so as to successively operate the plungers $q'$ pertaining to the respective blocks or supports H at the required times. Each block H may be carried by a spring-controlled arm $h^9$, arranged in such a manner that by means of a cam $k'$ on the stem $k$ the blocks H are successively thrown out of their circular path for the purpose of actuating the charged bottle and replacing it by a bottle to be charged. In conjunction or not with this latter device I may employ means for supplying a measured quantity of syrup to the bottles. This may comprise a suitable tank N, mounted on the frame C of the machine and provided with the usual measuring appliances—such as the cups $n'$, pipe $n^2$, and funnel $n^3$—a pipe $n^4$ being led from the tank N to the bottle on the bottle block or support. A lever $n^5$ on the measuring appliance is vibrated by means of levers or arms $n^6$ $n^7$, which are operated at the required intervals of time by the disk A, the same roller which vibrates the lever $h^7$ pertaining to the bottle-elevating mechanism serving to accomplish the syruping.

When employing seals other than screw-caps or stoppers, the placing and holding devices will require modification to suit the particular type of seal for which the apparatus is intended to be used.

What I claim as my invention, and desire to secure by Letters Patent, is—

1. In a machine for charging and sealing bottles or the like, the combination, with a vertically-movable slide supporting a sealing device, and a pivotally-mounted charging-nozzle engaged by said slide, of a rotating disk formed with a cam-surface, and a roller mounted on the slide and supported by the said cam-surface, the latter being so formed as to lower the slide and thereby move the charging-nozzle out of the path of the sealing device.

2. In a bottling-machine, the combination, with the charging-nozzle, snifting-valve mounted on said nozzle and support for the bottle to be charged, of a disk driven from the main shaft of the machine, cam-surfaces on the disk and bell-crank levers in connection with the charging-nozzle and snifting-valve respectively, substantially as herein described.

3. In bottle-seal-supplying mechanism, the combination, with a vertically-movable and rotatable sealing device, of a horizontally-pivoting carrier for the seal or stopper, a disk having slotted and raised cam-surfaces, a spring-pressed arm connecting the carrier with the disk, a roller, and an inclined wing or tailpiece mounted on the said carrier, arranged and operating substantially as and for the purpose set forth.

4. In a bottling-machine, a rotatable device for the reception of several bottles to be charged, comprising a rotatable spindle whereon are mounted the bottle-supports, the said supports traversing the periphery of a cam whereby each support is thrown out of its circular path for the release of the bottles when charged, and the means for rotating the said spindle, substantially as herein described.

In testimony whereof I have signed my name to this specification in the presence of two subscribing witnesses

RICHARD GRAINGER NASH.

Witnesses:
RUFUS WATERMAN,
ARTHUR DONN PIATT.